(12) United States Patent
Konchan et al.

(10) Patent No.: US 9,216,532 B2
(45) Date of Patent: Dec. 22, 2015

(54) INJECTION MOLD ASSEMBLY

(71) Applicant: GM GLOBAL TECHNOLOGY OPERATIONS LLC, Detroit, MI (US)

(72) Inventors: Jeffrey L. Konchan, Romeo, MI (US); Julien P. Mourou, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/180,657

(22) Filed: Feb. 14, 2014

(65) Prior Publication Data

US 2015/0231808 A1 Aug. 20, 2015

(51) Int. Cl.
*B29C 45/73* (2006.01)
*G06F 17/50* (2006.01)

(52) U.S. Cl.
CPC ............ *B29C 45/7312* (2013.01); *G06F 17/50* (2013.01)

(58) Field of Classification Search
CPC .................................................. B29C 45/7312
USPC .................................. 425/144, 547, 552, 548
See application file for complete search history.

(56) References Cited

U.S. PATENT DOCUMENTS

| | | | | |
|---|---|---|---|---|
| 3,837,769 A | * | 9/1974 | Erlenbach | 425/543 |
| 5,055,025 A | * | 10/1991 | Muller | 425/144 |
| 5,423,670 A | * | 6/1995 | Hamel | 425/144 |
| 8,591,219 B1 | * | 11/2013 | Neufarth et al. | 425/547 |

OTHER PUBLICATIONS

Siegfried Mayer, Optimized Mould Temperatures Control Procedures Using DMLS, Electro Optical Systems GmbH, Jun. 25, 2009, http://www.eos.info/press/press_releases/2009_250609.

* cited by examiner

*Primary Examiner* — Tim Heitbrink
(74) *Attorney, Agent, or Firm* — Quinn Law Group, PLLC

(57) ABSTRACT

An injection mold assembly for injection molding an object includes a first mold tool having a first tool surface and a second mold tool having a second tool surface. The first and the second tool surfaces are cooperatively configured to define a mold cavity between the tool surfaces for an injection molding of an object. The first mold tool has a tool element with a first side that has the first tool surface, and with a second side opposite the first side. Multiple fins extend from the second side of the tool element. A base supports the fins. The tool element, the fins and the base define a coolant flow cavity at the second side of the tool element. A method of designing the mold assembly is also disclosed.

12 Claims, 7 Drawing Sheets

INJECTION MOLD ASSEMBLY

TECHNICAL FIELD

The present teachings generally include an injection mold assembly and a method of designing an injection mold assembly.

BACKGROUND

Injection molded components are typically molded in a mold cavity formed between a first mold tool and a second mold tool. The first mold tool is sometimes referred to as the cavity side mold tool and the second mold tool is sometimes referred to as the core side mold tool. Plastic is melted in the mold cavity, and must be sufficiently cooled prior to separating the mold tools and ejecting the molded component. Cooling of the molded component is accomplished via a coolant, such as water, flowing through coolant lines drilled in the first and second mold tools. The mold tools are generally a relatively hard tool steel. Accordingly, the drilled passages are generally drilled as a series of straight segments. If the molded component has a complex or curved outer surface, the straight passages will not be an equal distance from the component as the cooling passages traverse the tool, resulting in uneven cooling of different portions of the tool surface. Cycle time for molding the component is thus dependent on those portions of the tool surface furthest from the cooling passages, and is increased until required cooling is achieved.

One known process, referred to as direct metal laser sintering, provides conformal cooling channels that can be equally spaced from the tool surface to enable more even cooling. The conformal cooling channels are provided by locally melting metal powder with a focused beam, layer by layer. This process is expensive as it is relatively slow and requires unique equipment and training that most mold makers do not have.

Additionally, the layout of the cooling channels is generally performed according to a trial and error, iterative process that relies on the skill level of the tool designer for each iterative layout of the cooling channels. Specifically, the designer selects an initial cooling channel pattern and inputs the layout into a computer that implements a tool design program that indicates the resulting tool surface temperature distribution. If the temperature distribution is not satisfactory, the designer reconfigures the cooling channel layout based on an educated guess, inputs the revised cooling channel layout into the computer, and the tool design program then determines whether the temperature distribution is sufficiently improved. This process is repeated however many times as necessary, is time consuming, and consistently obtaining a satisfactory final result is somewhat uncertain, as this is generally dependent upon the skill of the designer.

SUMMARY

An injection mold assembly is provided that enables sufficiently uniform cooling of molded components with a reduced cycle time in comparison to previous mold assembly cooling configurations. Additionally, the mold assembly can be designed with cooling channels positioned according to an automated method that satisfies requirements of a final cooling channel layout by correlating mold tool surface temperature distribution and cooling channel properties, with each iteration of cooling channel positions being driven by the previous mold tool surface temperature distribution and an optimization algorithm.

More specifically, an injection mold assembly for injection molding an object includes a first mold tool having a first tool surface and a second mold tool having a second tool surface. The first and the second tool surfaces are cooperatively configured to define a mold cavity between the tool surfaces for injection molding of an object. The first mold tool has a tool element with a first side that has the first tool surface, and with a second side opposite the first side. Multiple fins extend from the second side of the tool element. A base supports the fins. The tool element, the fins and the base define a coolant flow cavity at the second side of the tool element such that coolant in the coolant flow cavity contacts the second side of the tool element. In other words, the entire second side of the tool element exposed between the fins is in contact with coolant in the coolant flow cavity. The tool element can be configured to have a substantially uniform thickness between the first side and the second side, so that coolant in contact with the second side is at a uniform spacing from the first tool surface, minimizing cycle time and improving cooling uniformity. As used herein a "substantially uniform thickness" is a thickness of the tool element across the first tool surface that varies no more than a predetermined amount, such as an amount within the dimensional tolerances of the formed tool element, or by no more than 5 to 10% pending the customer's needs.

A method of designing an injection mold assembly includes providing an initial layout of a selected number of cooling channels. Each cooling channel is modeled by a selected number of cooling elements. Each cooling channel is in contact with and follows a contoured surface on a cooled side of a mold tool element.

The method includes calculating temperatures of tool surface elements of a tool surface on a tool surface side of the mold tool element that is opposite the cooled side. The tool surface elements spatially correspond with the cooling elements and are cooled by coolant flow in the cooling channels via heat conduction through the tool element. Under the method, it is determined whether a predetermined condition is satisfied by the calculated temperatures of the tool surface elements. If the predetermined condition is not satisfied, a revised layout of the cooling channels is generated according to an optimization module that uses the calculated temperatures of the tool surface elements. The method iterates layouts of the cooling channels until the predetermined condition is satisfied. Specifically, calculating tool surface element temperatures corresponding with the cooling elements in the revised cooling channel layout from the previous iteration, determining whether the predetermined condition is satisfied, and generating a revised cooling layout is repeated until the predetermined condition is satisfied. The cooling channel layout that satisfies the predetermined condition is the final cooling channel layout. An injection mold assembly is then provided with the tool element and with cooling channels and the cooled side that corresponds with the final cooling channel layout.

The iteration process is automated, in that it is carried out by a computer-implemented algorithm. The portion of the algorithm that calculates temperatures of the tool surface elements can be carried out by separate tool design software. By interfacing the tool design software with the automated and optimized cooling channel iterations, tool design time is reduced and the resulting cooling channel layout enables a more uniform tool surface temperature distribution.

The above features and advantages and other features and advantages of the present teachings are readily apparent from the following detailed description of the best modes for carrying out the present teachings when taken in connection with the accompanying drawings.

DETAILED DESCRIPTION

Figure 1:
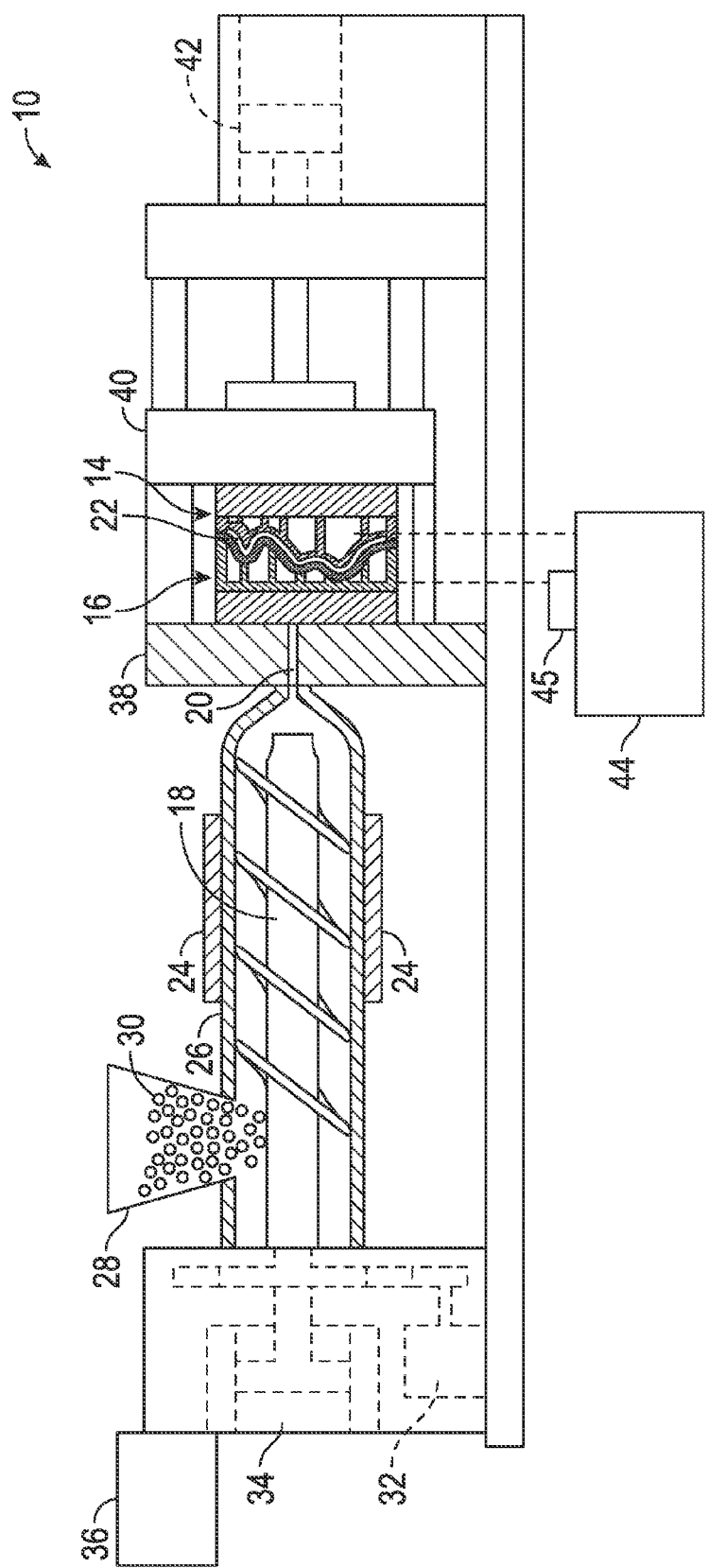
FIG. 1 is a schematic illustration in partial cross-sectional side view of an injection mold assembly.
Figure 7:
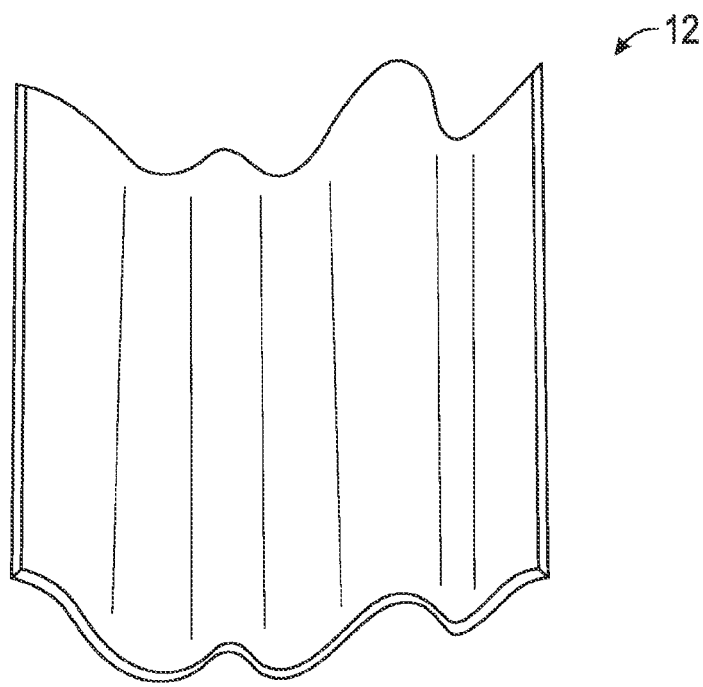
FIG. 7 is a schematic illustration in perspective view of a molded object that has been molded in the mold assembly of FIGS. 1 and 2.

Referring to the drawings, wherein like reference numbers refer to like components, FIG. 1 shows an injection mold assembly 10 for injection molding an object 12, such as the complex contoured plastic object 12 shown in FIG. 7. As further explained herein, the injection mold assembly utilizes novel mold tools 14, 16 that enable more uniform cooling of the object 12. Cooling flow paths through the mold tools 14, 16 can be optimized according to an efficient design method.

The injection mold assembly 10 utilizes a motorized reciprocating screw 18 that delivers molten plastic through a nozzle 20 into a mold cavity 22 formed by and between the first mold tool 14 and the second mold tool 16. Heaters 24 surround a barrel 26 that supports the screw 18 and melt the plastic, which is fed into the barrel 26 from a plastic hopper 28 as plastic pellets 30. A motor 32 turns the screw 18, and a hydraulic cylinder 34 is controlled via an electronic controller 36 to reciprocate the screw 18. The plastic is fed through a passage in a stationary platen 38 that supports the second mold tool 16, which is also referred to as the cavity tool. A movable platen 40 supports the first mold tool 14, i.e., the core tool. A hydraulically-actuated clamping cylinder 42 can also be controlled by the controller 36 to move the movable platen 40 and the first mold tool 14 attached thereto to close the tools 14, 16, after which time the plastic is injected into the cavity 22. Pressure is maintained by the cylinder 42, and a cooling system 44 controlled by the controller 36 regulates the temperature of the mold tools 14, 16 as described herein. A pump 45 is used to circulate the coolant through the cooling system 44. The cooling system 44 shown includes a supply manifold that directs the coolant to the cavity 22, and a collection manifold that receives the coolant from the cavity 22 and directs the coolant back through a temperature control device and through the pump 45. Once the object 12 (shown in FIG. 2) is sufficiently formed and cooled, the clamping cylinder 42 is retracted, opening the cavity 22, and ejector pins (not shown), eject the molded object 12. It should be appreciated that, although only one controller 36 is shown and described, multiple interconnected controllers could be used to control the various systems of the mold assembly 10.

Figure 2:
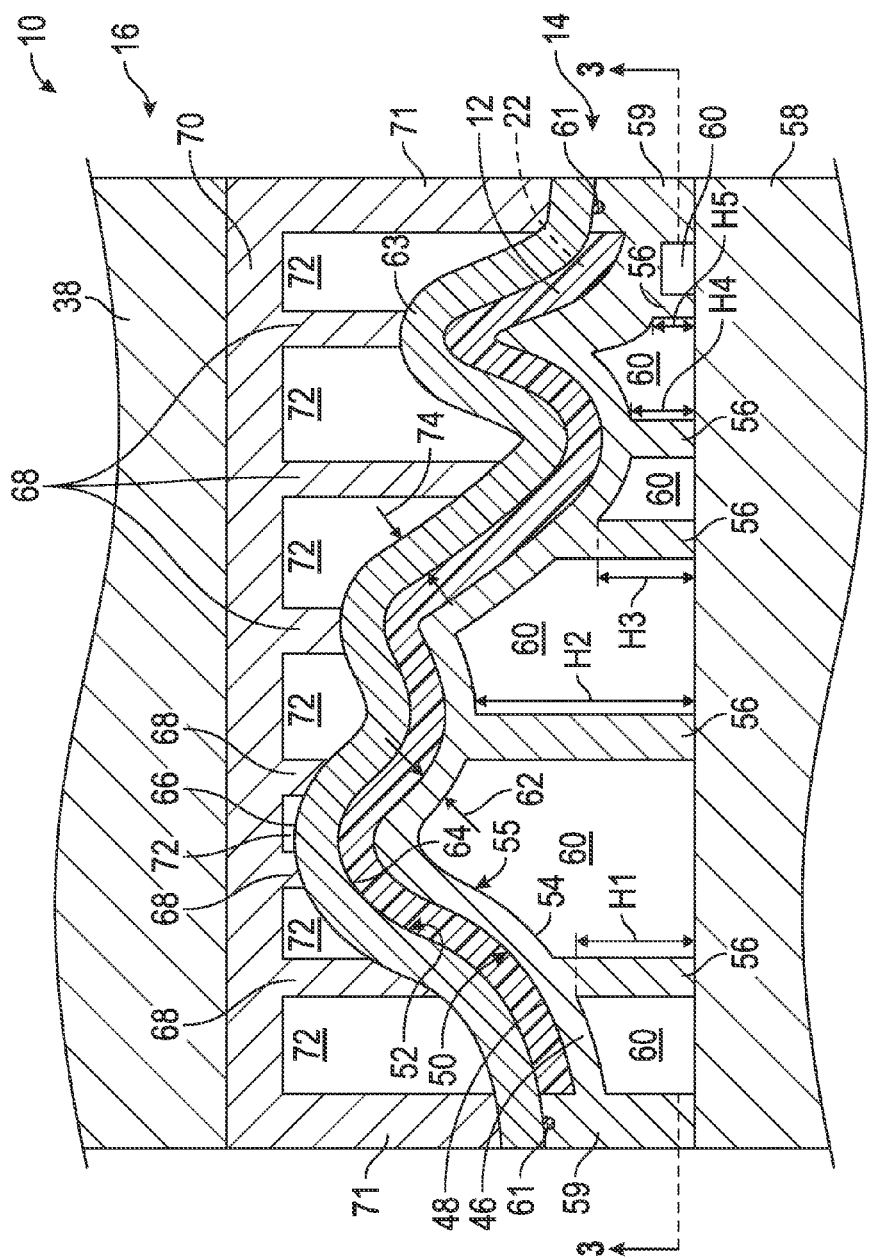
FIG. 2 is a schematic cross-sectional illustration of mold tools of the mold assembly of FIG. 1 forming an object.

FIG. 2 shows a portion of the mold assembly 10 in fragmentary view and rotated 90 degrees relative to FIG. 1 for clarity. The first and second mold tools 14, 16 are configured to be relatively inexpensive to produce, yet enable uniform cooling of the tool surfaces in contact with the object 12 while reducing cycle time in comparison to traditional cooling arrangements. The first mold tool 14 has a tool element 46 that has a first side 48 with a first tool surface 50 facing and partly defining the mold cavity 22. The second mold tool 16 has a tool element 63 with a second tool surface 52 facing and partly defining the mold cavity 22. The first and the second tool surfaces 50, 52 are cooperatively configured to define the mold cavity 22 between the tool surfaces 50, 52.

The tool element 46 has a second side 54 opposite the first side 48 and also referred to as the cooled side. Multiple fins 56 extend from the second side 54 of the tool element 46. A base 58 supports the fins 56. The fins 56 can also be referred to as pillars or stanchions, as each acts as a structural support for the tool element 46 and must bear pressure loading during the molding process. In the embodiment shown, the fins 56 are integral with the first tool element 46. The tool element 46, the fins 56 and the base 58 define a coolant flow cavity 60 at the second side 54 of the tool element 46 such that coolant in the coolant flow cavity 60 contacts the second side 54 of the tool element 46 to cool the surface 55 of the second side 54. End members 59 extend from the tool element 46 to enclose the sides of the coolant flow cavity 60. The end members 59 seal to the second tool element 63, described below, at seals 61 to enclose the mold cavity 22. The tool element 46 is a tool steel sufficiently hard to withstand the pressures required for injection molding. The tool element 46 can be machined so that a mold wall thickness (mwt) 62 of the tool element between the first side 48 and the second side 54 remains within a predetermined range at least over the entire first tool surface 50.

The second mold tool 16 also has a tool element 63 that has a first side 64 with the second tool surface 52, and has a second side 66 opposite the first side 64. Multiple fins 68 extend from the second side 66 of the tool element 63. The fins 68 can also be referred to as pillars or stanchions, as each acts as a structural support for the tool element 63 and must bear pressure loading during the molding process. Each of the fins 56 has a different respective height H1, H2, H3, H4, H5 as necessary to span the coolant flow cavity 60 from the complex, contoured tool element 46 to the base 58. A base 70 supports the fins 68. In the embodiment shown, the fins 68 are integral with the base 70. The tool element 63, the fins 68 and the base 70 define another coolant flow cavity 72 at the second side 66 of the tool element 63 such that coolant in the coolant flow cavity 72 contacts and cools the surface at the second side 66 of the tool element 63. End members 71 extend from the base 70 to enclose the sides of the coolant flow cavity 72. The tool element 63 is a tool steel sufficiently hard to withstand the pressures required for injection molding. The tool element 63 can be machined so that a mold wall thickness (mwt) 74 of the tool element 63 between the first side 64 and the second side 66 remains within a predetermined range over at least the entire second tool surface 52. The base 70 and fins 68 can optionally be a less expensive material than the tool steel of the second tool element 63. For example, the base 70 and fins 68 can be aluminum.

Figure 3:
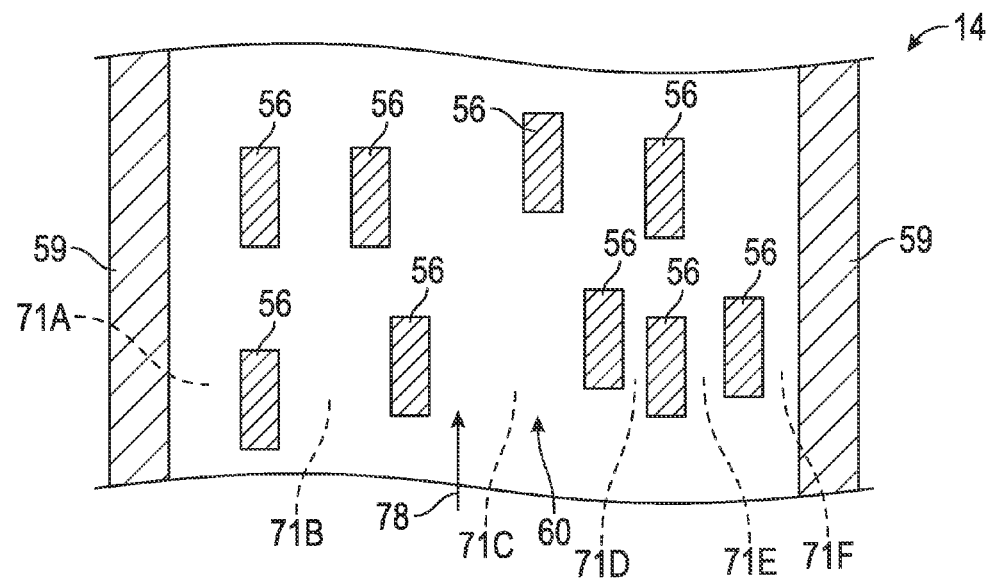
FIG. 3 is a schematic illustration in cross-sectional view taken at lines 3-3 of one of the mold tools of FIGS. 1 and 2.

FIG. 3 shows a cross section of a portion of the tool 14 in which the fins 56 have been positioned and sized according to a method that utilizes an optimization algorithm to provide a final layout of coolant flow paths 71A, 71B, 71C, 71D, 71E, and 71F through the coolant flow cavity 60. The final layout is optimized to satisfy a predetermined condition, such as a temperature distribution at the first tool surface 50 in which all temperatures are substantially uniform, in that they are all within a predetermined range, or as further described herein.

Figure 4:
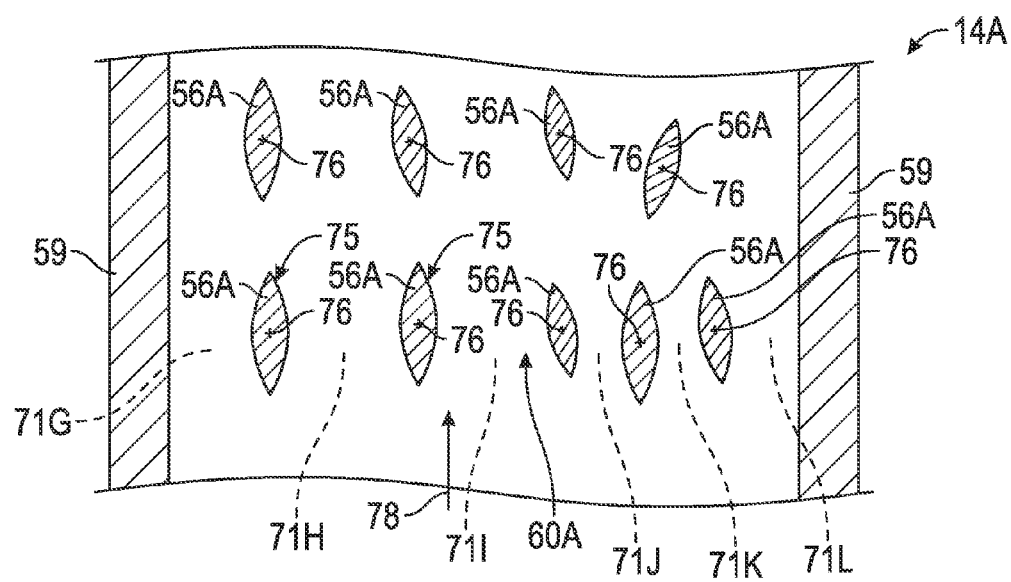
FIG. 4 is a schematic illustration in cross-sectional view taken of an alternative embodiment for the mold tools of FIG. 3.
Figure 5:
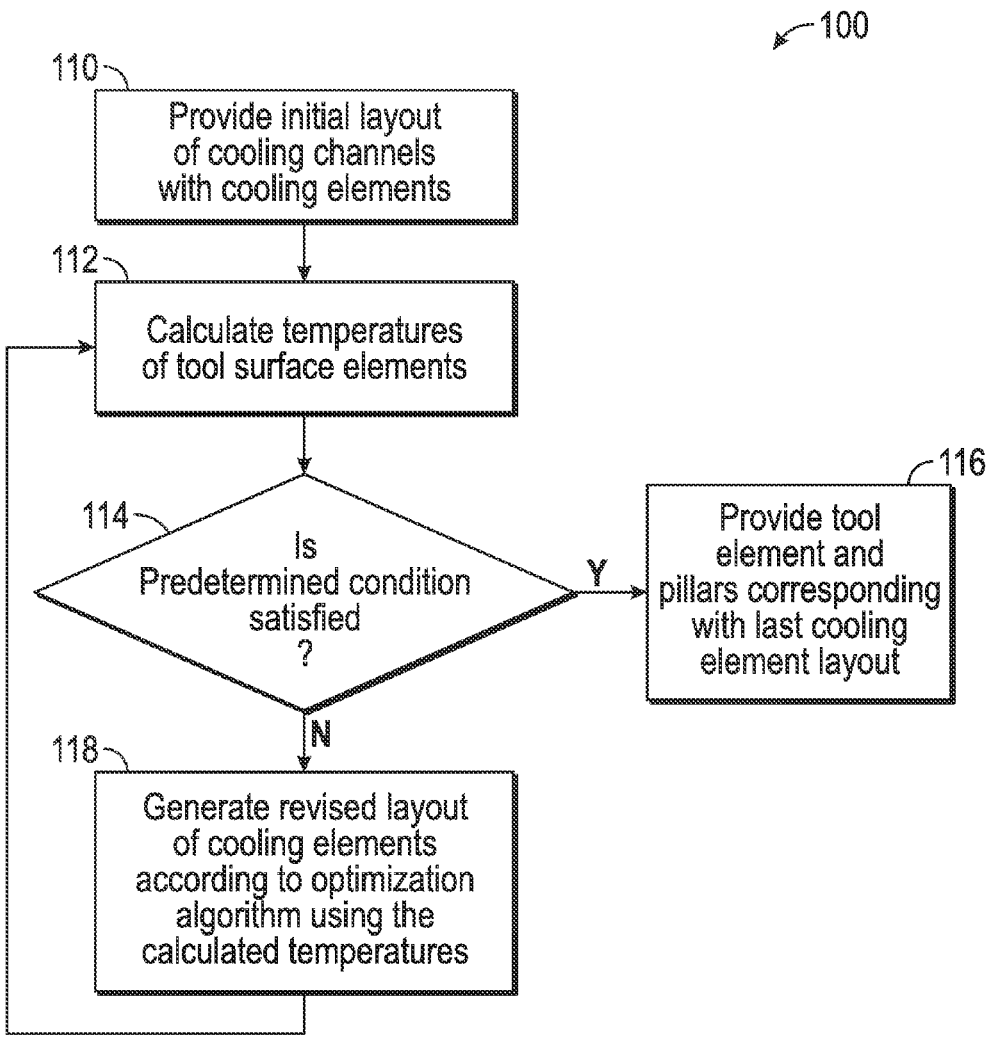
FIG. 5 is a schematic illustration of a flow diagram of a method of designing a mold assembly with tool elements and pillars as shown in FIG. 2.

FIG. 4 shows an alternative tool 14A that could be used in place of tool 14 in FIG. 1. The tool 14A also has a coolant flow cavity 60A with an arrangement of the fins 56A positioned to provide coolant flow paths 71G, 71H, 71I, 71J, 71K and 71L through the coolant flow cavity 60A that achieves a temperature distribution at the first tool surface 50 in which all temperatures are substantially uniform, in that they are all within a predetermined range. The fins 56A each have an airfoil-shaped cross-section normal to their respective height H1, H2, H3, H4, H5 as shown in FIG. 4. The airfoil-shaped cross-section decreases resistance to flow. The more angular, generally rectangular cross section of the fins 56, on the other hand, may locally increase turbulence through the coolant flow paths. The fins 56A each have an outer surface 75 in contact with the cooling fluid in the coolant flow cavity 60A, and are each oriented about a respective longitudinal axis 76 so that the outer surface 75 will direct the cooling fluid to promote the uniform temperature distribution. In other words, some of the fins 56A are positioned somewhat at an angle relative to general direction of flow 78 to locally increase or decrease the cooling effect on the tool element 46. As further explained herein, the cooling flow paths 71A, 71B, 71C, 71D, 71E, and 71F are between adjacent ones of the fins 56 and have widths configured so that tensile stress, shear stress, and deflection of the tool 14 are below predetermined maximum limits FIG. 5 is a flow diagram of a method 100 of designing an injection mold assembly such as the injection mold assembly 10 of FIG. 1. The method 100 is described with respect to the first mold tool 14, including the tool element 46, fins 56, coolant flow cavity 60 and base 58. The method 100 is equally applicable to the design of the second mold tool 16, including the tool element 63, fins 68, coolant flow cavity 72 and base 70. In fact, each tool 14, 16 would be analyzed individually for satisfaction of a predetermined condition, as discussed herein. Many of the blocks or steps of the method 100 can be configured as a single algorithm, stored on and executed by a single processor on a single computer, or different portions of the method 100 can be separate algorithms that interface with one another and are stored on and executed by a processor, or are stored on and executed by multiple processors that may be on a single computer or multiple computers.

Figure 8:
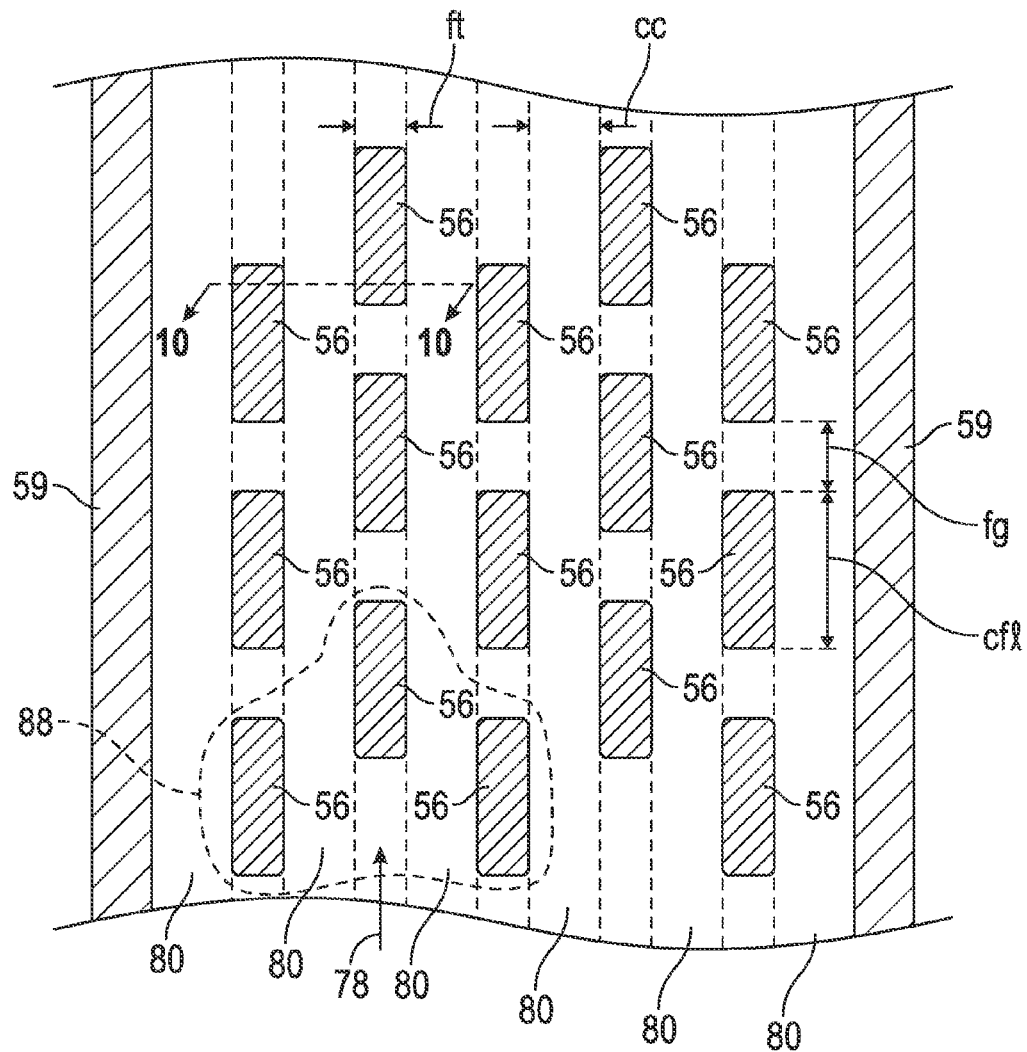
FIG. 8 is a schematic illustration in cross-sectional view of the mold tool of FIG. 3 showing the initial cooling channel layout of FIG. 6 and corresponding locations of pillars.

The method 100 begins with block 110, providing an initial layout of a predetermined number of cooling channels representing cooling flow paths through the cooling flow cavity 60 between adjacent sets of fins 56. The cooling channels 80 are cylindrical models of the actual cooling flow paths in cavity 60 or 72, which are open cavities interrupted only by the fins 56 or 68, as shown in FIGS. 2 and 8. However, the ability to simplify modeling of the less constrained cooling flow paths using physical properties of coolant flowing in constrained cylindrical cooling channels enables the final positions and sizes of the fins 56 to be determined.

Figure 6:
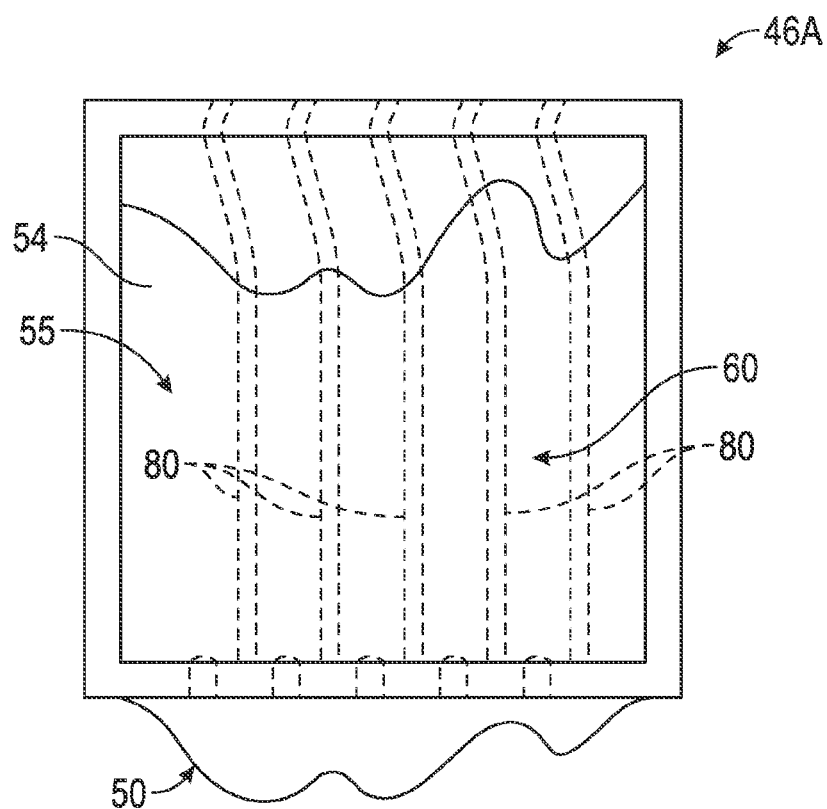
FIG. 6 is a schematic illustration in perspective view of a portion of one of the mold tools of FIG. 2 with an initial cooling channel layout shown in phantom.

The initial layout will be revised according to an iterative procedure, as described herein, to arrive at a final layout that satisfies a predetermined condition. For example, referring to FIG. 6, an initial model 46A of the tool element 46 is shown without the fins 56 that will establish the coolant flow paths in the coolant flow cavity 60. The initial model 46A is shown from an underside so that the cooled surface 55 of the second side 54 is visible. The initial layout includes a number of cooling channels 80 that are representative of coolant flow paths. Each cooling channel 80 is in contact with, normal to, and follows the contoured cooled surface 55 of the second side 54 (i.e., the cooled side) of the tool element 46. The number of cooling channels 80 selected can be derived from a cooling power estimation subroutine, based on approximate cooling time for the mold cycle to produce the object 12, and based on an estimate of the total amount of heat to be removed by the cooling system during the mold cycle. In other words, the number of cooling channels 80 selected is that needed to remove the necessary heat in the desired cycle time.

Other system requirements or limitations can be imposed on the physical characteristics or other parameters of the injection mold assembly 10 or molding process in determining the final locations of the cooling elements 82 and corresponding dimensions of the tool elements 46, 63, and of the pillars 56, 68. For example, it may be desirable to minimize cooling time for manufacturing efficiency.

For example, the cooling time and number of cooling lines can be optimized to maximize the heat transfer rate $\dot{Q}_{conduction}$ from the mold while maintaining a uniform temperature at the tool surface 50, 52; where:

$$\dot{Q}_{conduction} = k \frac{\partial T}{\partial z};$$

where k is the thermal conductivity of the tool elements 46, 63;

$$\frac{\partial T}{\partial z}$$

is the temperature gradient of the tool elements 46, 63 in the direction z of the thickness (i.e., the mold wall thickness mwt) of the tool elements 46, 63.

The temperature of the surfaces 50, 52 of the tool elements 46, 63 is related to time during the cooling cycle as flows:

$$T_{x=0}(t) = (T_{coolant} + (T_{melt} - T_{coolant}) \sum_{m=0}^{\infty} \frac{(-1)^m}{2m+1} e^{-\frac{\pi^2 \alpha (2m+1)^2}{h^2}};$$

where $T_{coolant}$ is the coolant temperature; $T_{melt}$ is the temperature of the plastic in the cavity 22; m is mass; a is thermal diffusivity and h is part thickness.

The rate of change of the temperature of the surfaces 50, 52 of the tool elements 46, 63 is related to the properties of the material of the tool elements 46, 63 as follows:

$$\frac{\partial T}{\partial t} = \alpha \frac{\partial^2 \overline{T}}{\partial z^2};$$

where T is the temperature of the tool elements 46, 63 in the direction z of the thickness (i.e., the mold wall thickness mwt) of the tool elements 46, 63; and a is the thermal diffusivity of the material of the mold tools 46, 63.

Specifically, to estimate cooling power and thus the number of cooling channels 80 required for one of the tools 14, 16, the cooling time TC in seconds can first be approximated based on the relationship:

$$TC = 2\frac{s}{\text{mm}^2} * mwt \text{ mm}^2;$$

where s is part thickness in millimeters (mm) (i.e., the thickness of the object 12); where mwt is the mold wall thickness in millimeters (mm) of tool element 46 or 63. The amount of heat to be removed and the rate of heat transfer per cooling channel 80 can be estimated as follows:

$$Q_m = m * C_p (T_{melt} - T_{eject});$$

$$\dot{Q}_c = \frac{Q_m}{TC};$$

and $$\dot{Q}_{channel} = \frac{\dot{Q}_c}{n};$$

where $Q_m$ is the total amount of heat to be removed from the molten plastic; m is the mass of the plastic in the mold cavity 22 and in any runner passage or passages in the mold tool 14 or 16 leading to the mold cavity 22; $C_p$ is the coolant specific heat; $T_{melt}$ is the melting temperature of the plastic; $T_{eject}$ is the temperature of the molded object 12 when ejected from the mold cavity 22; $\dot{Q}_c$ is the rate of heat to be transferred per mold cycle; TC is the cooling time; $\dot{Q}_{channel}$ is the rate of heat transfer per cooling channel 80 (i.e., cooling channel power in Joules per second or Watts); and n is the number of cooling channels 80.

The coolant flow rate V in each channel 80 can be estimated from the following relationship:
$\Delta T_{coolant} = \dot{Q}_{channel} / (V * \rho * C_p)$; where $\Delta T_{coolant}$ is the increase in temperature of the coolant in a single pass through the cooling channel; and $\rho$ is the coolant density. $\Delta T$ coolant can be set to the allowable increase in coolant temperature per pass, such as but not limited to a number from 0.1 to 1 C (degrees Celsius), and the above relationship can be solved for V. The coolant flow rate V can also be limited by a requirement that the coolant flow in the channels 80 is turbulent in order to maximize heat transfer. The Reynolds number Re is related to the coolant flow rate by the following relationship:

$$R_e = \frac{\rho V D}{\mu};$$

where $\rho$ is the coolant density; V is the coolant flow rate, also referred to as coolant velocity; D is the diameter of the channel equivalent (i.e., the equivalent diameter of the channel 80 to a channel that is cylindrical in cross section, assuming the channel 80 is a noncylindrical channel, which can be estimated by multiplying the diameter of the round channel by an equivalency or adjustment factor.

The Reynolds number Re can be limited to a value above 2,300, with 4,000 being a typical number. Additionally, the pressure in the cooling channel 80 must be a value less than the maximum capable by the pump 45 used to circulate the coolant, and the coolant heat removal rate per channel, $\dot{Q}_{channel}$, must be greater than or equal to the cooling channel output, and the capability of the mold temperature controller to sufficiently monitor temperature with the speed and accuracy required should be confirmed. An optimizing algorithm can be used to optimize the coolant heat removal rate $\dot{Q}_{channel}$ versus the coolant pumping energy expended by the pump 45.

The area of a cooling channel 80 can be approximated between a maximum value and a minimum value for a cylindrical channel, each of which can be converted into a pattern area size equivalent, to match the area of a selected linked pattern, such a linked pattern 88 discussed herein. The maximum and minimum values can be approximated as follows:

$$D_{max} = \frac{(4 * \rho * V)}{\pi * \mu * 4000};$$

where the Reynolds number is 4,000;

$$D_{min} = \sqrt{\frac{\rho * l * V^2}{10\pi * \Delta P}};$$

where l is the length of the cooling channel; and $\Delta P$ is the pressure drop permitted in the cooling channel 80. $D_{max}$ and $D_{min}$ can each be converted into a pattern area size equivalent by multiplying by a correction factor that can be developed based on testing.

The cooling from the tool surfaces 50, 52 is related to the maximum pressure on the surfaces exerted by the pressurized melted plastic in the mold cavity 22:

$$P_{maxmelt} = \frac{\sigma_{endurance}}{2.6} = 175 \text{ MPa};$$

where $\sigma_{endurance}$ is the endurance stress, which is the maximum stress that can be exerted on the plastic material in the mold cavity 22.

The spacing of the cooling channels 80, referred to as the cooling pitch, can also be limited by a maximum variance in the heat flux across the tool surface 50, 52 of the tool element 46, 63 according to the following relationship:

$$\Delta \dot{Q}[\%] \cong \left(\frac{W_{line}}{H_{line}}\right)^{2.8 ln\left(\frac{W_{line}}{H_{line}}\right)};$$

where $\Delta \dot{Q}[\%]$ is the maximum variance in the heat flux across the tool surface 50, 52 of the tool element 46, 63; $W_{line}$ is the width of the cooling channel 80, denoted by l in FIG. 10; $H_{line}$ is the height of the cooling channel 80 from the cooled surface 55 of the tool element 46 (or the cooled surface of the tool element 63), denoted by the fin height fh in FIG. 10.

Each cooling channel 80 is modeled by cooling elements 82. The cooling elements 82 represent the coolant in the coolant flow cavity 60, with each cooling element 82 representing the coolant at a specific location, identifiable by specific Cartesian coordinates.

Figure 9:
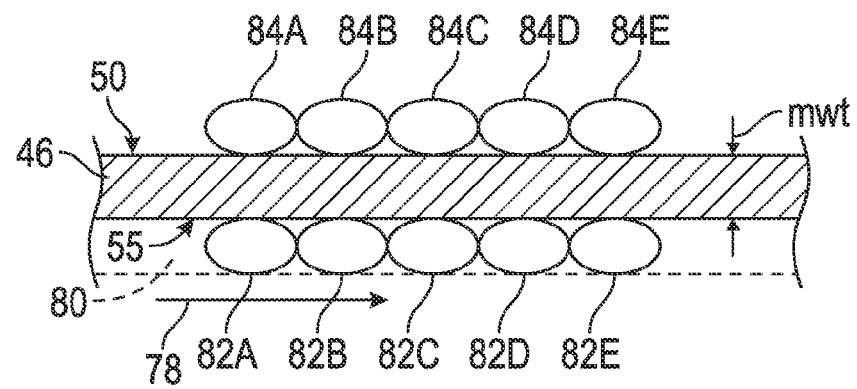
FIG. 9 is a schematic illustration in fragmentary side view of the tool element of one of the mold tools of FIG. 2 and one of the cooling channels of FIG. 8, showing representative tool elements and cooling elements.

For purposes of mathematical computations carried out under the method 100, each cooling element 82 is paired with a tool surface element 84. Each tool surface element 84 represents the first tool surface 50 at a specific location, identifiable by a specific Cartesian coordinate. Each cooling element 82 is paired with a specific tool surface element 84 directly opposite the specific cooling element 82 according to a line normal to the thickness (mwt) 74 of the tool element 46 at the cooling element 82. This is indicated in FIG. 9 with cooling elements denoted 82A, 82B, 82C, 82D, and 82E paired with tool surface elements 84A, 84B, 84C, 84D, and 84E, respectively. The tool surface elements 84A, 84B, 84C, 84D, and 84E spatially correspond with the cooling elements 82A, 82B, 82C, 82D, and 82E and are cooled by coolant flow in the cooling channels 80 via heat conduction through the tool element 46.

Under the method 100, the number of cooling elements 82 per cooling channel 80 to be used for purposes of the heat balance and transfer equations utilized in the method 100 must be selected by the designer at the outset of the design process. Although only five cooling elements 82A, 82B, 82C, 82D, and 82E are shown for the cooling channel 80 in FIG. 9, many more cooling elements would likely be selected for greater accuracy in the modeling of heat transfer and other physical characteristics of the tool element 14, fins 56, and coolant flow. Additionally, the cooling elements 82A, 82B, 82C, 82D, and 82E need not be immediately adjacent one another as show in FIG. 9, and can instead be spread further apart from one another along the length of the cooling channel 80 of FIG. 6. Different numbers of cooling elements 82 can be used to model different cooling channels 80 in the method 100, or the same number can be used to model each channel 80.

Figure 10:
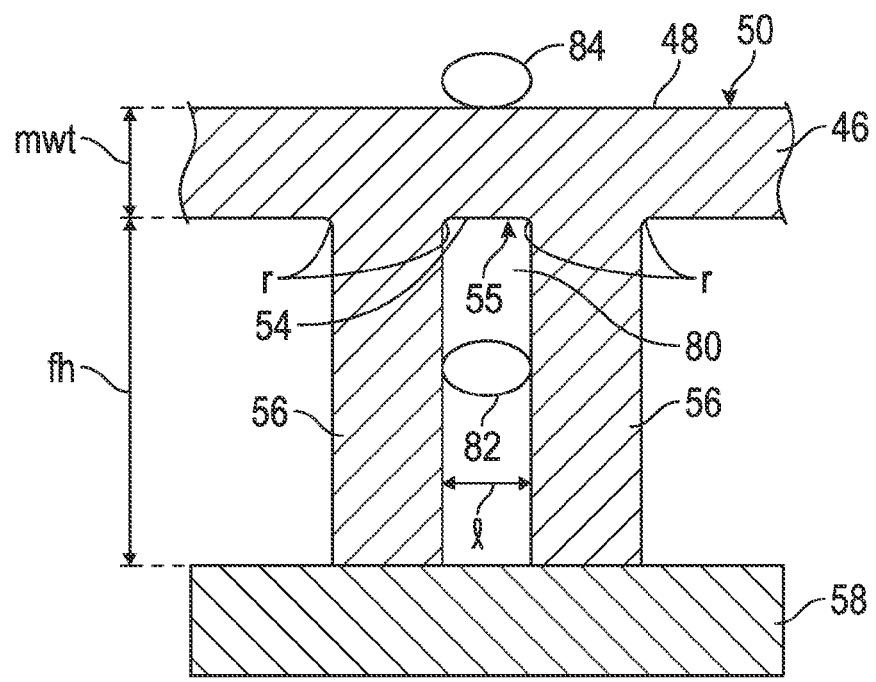
FIG. 10 is a schematic illustration in schematic cross-sectional view taken at lines 10-10 in FIG. 8 of a portion of the mold element and pillars of FIG. 2.

FIG. 10 shows a cooling element 82 midway in the cooling channel 80 between the tool element 46 and the base 58, to indicate that the physical characteristics of each cooling element 82A, 82B, 82C, 82D, and 82E shown in contact with the cooled surface 55 is actually based on the average of the coolant in the cooling channel 80 normal to the specific location on the cooled surface 55. References herein to cooling element 82 also refer to the more specifically denoted cooling elements 82A, 82B, 82C, 82D, and 82E. References herein to tool surface element 84 also refer to the more specifically denoted tool surface elements 84A, 84B, 84C, 84D, and 84E.

The specific location of each cooling element 82 will change as the layout of the cooling channels 80 is revised during iterations of portions of the method 100 until the desired predetermined condition is satisfied, as described herein. In one embodiment, the desired predetermined condition is satisfied when the temperatures of each of the tool surface elements 84 are determined to be within a predetermined range of temperatures. Alternatively, in another embodiment, the predetermined condition is a predetermined number of iterations of calculating temperatures of the tool surface elements 84 in block 112, as described herein. Accordingly, in such an embodiment, the final layout of the cooling channels 80, and the corresponding positions of the fins 56, is realized after the predetermined number of iterations has been accomplished, such as by way of nonlimiting example, 50 iterations. Although the cooling channels 80 are initially modeled as straight, the final locations of the cooling elements 82 initially included in each initially straight cooling channel 80 will establish a cooling flow path through the mold cavity 22 that will likely not be completely straight, as indicated in FIGS. 3 and 4.

FIG. 8 shows an example of the initial layout of cooling channels 80 input initially into the computer that executes the method 100, and the associated initial positions of the fins 56. Each cooling channel 80 is between adjacent rows of fins 56, except the cooling channels at the far ends, which are between an end member 59 and a row of fins 56. Various design constraints can be implemented to govern the relationship between the physical dimensions of the fins 56 and the cooling channel 80 both in the initial layout and as limitations on changes to the layout during the automated iterative process.

For example, the following design constraints are implemented in providing the initial cooling channel layout. First, the ratio of fin separation (fg) to fin length (cfl) shown in FIG. 8 can be constrained as follows:

$$fg/cfl=0.5 \text{ to } 0.1.$$

The range of allowable ratio of fin separation (fg) to fin thickness (ft) can be constrained as follows:

$$1.0 < fg/ft > 4.0.$$

The ratio of fin thickness (ft) to width (cc) of the cooling channel 80, also indicated as l, can be constrained as follows:

$$ft/cc < 0.1.$$

The cooling channel 80 can be constrained so that the Reynolds number (Re) in the cooling channel 80 is above 2,300. Finally, the tool bit size used in machining angled interfaces of the tool element 46 and the fins 56 can be constrained to a tool bit size with a radius of greater than 2 millimeters to result in a radius (r) of the interfaces, shown in FIG. 10, of greater than 2 millimeters.

Optionally, certain subsets of the cooling elements 82 can be linked together in the design iterations so that revised locations of the linked cooling elements 82 in each iteration maintain the same initial relative placement to one another. Referring to FIG. 8, a triplet pattern of linked cooling elements, referred to as a linked pattern 88, may be used. For example, cooling elements 82 falling within the bounds of the linked pattern 88, surrounding a triplet pattern of fins 56, can be manipulated to remain in the same relative location to one another throughout the iterations.

The injection mold assembly 10 can also be optimized for one or more of the following: minimize cooling time, provide a heat flow balance in which the coolant heat flow in the cavities 60, 72 is equal to the heat flow of the plastic melt in the mold cavity 22, provide a coolant flow rate that minimizes a temperature differential across the tool elements 46 and 63 and enables cooling channel efficiency, provides a pattern for the cooling elements 82 that ensures turbulent flow (e.g., Reynolds number greater than 2,300), provides final positions of the cooling elements 82 that provide uniform heat flow through the tool elements 46, 63, ensures adequate tool life based on a cyclical stress failure curve, a pressure map of pressure applied to the tools 14, 16, and the number of cycles the injection mold assembly 10 will be utilized, and ensures that a pressure drop across each cooling channel 80 would be enabled by a capability of the outside the tool ancillary heat extraction process.

For example, the heat flux from the plastic melt in the mold cavity 22 can be determined by the algorithm in block 110 according to the following relationships:

$$Q_m = \frac{(\Delta h * A_m * s * p)}{2} * tc;$$

$$tc = TC + Tn; \text{ and}$$

$$TC = C_c * S^2;$$

where $Q_m$ is the total heat from the injected plastic melt for molding the object 12; $\Delta h$ is the enthalpy difference in kilojoules per kilogram (kj/kg) of the specific enthalpy at the material temperature at injection less the specific enthalpy at the material temperature at ejection; p is the density of the plastic melt; $A_m$ is the surface area of the molded object 12; TC is the cooling time during which the mold tools 14, 16 are closed together with the injected plastic therein; Tn is the nonproductive time required for opening and closing the mold tools 14, 16 and the time for ejecting the molded object 12 from the mold tools 14, 16; tc is the overall cycle time; S is the wall thickness of the molded object 12; $C_c$ is a cooling constant (with a range of 2 to 3 seconds/mm$^2$) that is physically similar for unfilled thermoplastics, and is used as a simple correlation for estimating cooling time. $C_c$ is an estimation of the cooling gradient in the center of the plastic. Graphs of cooling gradient versus Fourier number are readily available to estimate geometry.

The cooling time TC is also related to the properties of the plastic material of the molded object 12 as follows:

$$TC = \left(\frac{s^2}{a_{eff} * \Pi^2}\right) * \ln\left(\frac{\frac{8}{\Pi^2}(Tm - Tw)}{Te} - Tw\right);$$

$$a = \frac{k}{(p * Cplas)};$$

$$Fo = \frac{(a * t)}{x^2};$$

where a is thermal diffusivity; $a_{eff}$ is effective thermal diffusivity; k is the thermal conductivity of the plastic material; Cplas is the specific heat of the plastic material; Fo is Fourier number as determined from correlation charts between plates, cylinders, and other different geometries; Tm is the melting temperature of the plastic material; Tw is the wall temperature of the mold cavity 22, which is the same as the temperature of the tool surface 50; Te is the demolding temperature, also referred to as the temperature of the object 12 at the time of ejection from the cavity mold 22. Notably, the S wall thickness of the molded object 12 is a squared term in the cooling time relationship above. Reducing the thickness of the object 12, therefore can significantly reduce the cooling time. Cooling that utilizes the mold tools 14, 16 enables very uniform cooling, which should allow a reduced thickness in the molded object 12, and a related reduction in the cooling time.

At equilibrium, $\dot{Q}_m + \dot{Q}_w = 0$; where $\dot{Q}_m$ is heat flux from the injected plastic melt for molding the object 12; $\dot{Q}_w$ is the heat flux into the tool element 46. The cavity wall temperature Tw at equilibrium can be solved if cooling time TC is known. Cooling time TC can be an input to the system, or can be estimated. Similarly, if the cavity wall temperature is Tw is known, the cooling time TC at equilibrium can be determined from the above relationship. In that case, the cavity wall temperature is Tw can be an input to the system, such as if a certain cavity wall temperature TC is desired.

The heat flow rate Q for the coolant is related to the parameters of a cooling system modeled by the cooling channels 80 as follows:

$$\dot{Q} = U * A * Lc * (Tc - Tf);$$

$$U = \frac{Nu * K * 12}{D};$$

$$Nu = 0.116 * Pr^{0.33}(Re^{0.66} - 125)\left[1 + \left(\frac{D}{12 * Lc}\right)^{0.66}\right]\left(\frac{\mu c}{\mu f}\right)^{0.14};$$

$$Pr = \frac{3600 * c_\rho * \mu f}{K};$$

where Re is the Reynolds number of the coolant flow; Pr is the Prandtl number of the coolant flow; Nu is the Nusselt number of the coolant flow; Lc is the length of the cooling channel 80 in mm; D is the diameter of the cooling channel equivalent (i.e., the diameter of a cylindrical channel equivalent in flow volume to the cooling channel 80 with width l and height fh shown in FIG. 10); ρ is the coolant density; μ is the coolant fluid viscosity; μc is the coolant viscosity at the temperature of the cavity 22; K is the coolant thermal conductivity; Cp is the coolant specific heat; Tc is the surface cavity temp; Tf is the coolant temperature; A is the exposed surface cooling area at the side 54; U is the heat transfer coefficient of the coolant; and $\dot{Q}$ is the heat flow rate of the coolant.

The dimensions of the cooling channels 80 and the fins 56 or 68 can be based an optimization of structural loading to ensure tool life (i.e., integrity of the tools 14, 16). One optimization procedure is to select the cooling channel distance cc, also shown as l, based so that tensile stress, shear stress, and deflection of the tool elements 46, 63 remain below the maximum allowable tensile stress, the maximum allowable shear stress, and the maximum deflection of the tool elements 46, 63, respectively. For example, $$\sigma_{bmax} = \frac{0.5 * P * l^2}{d^2};$$

$$\tau_{max} = \frac{0.75 * P * l}{d}; \text{ and}$$

$$f_{max} = \frac{1000 * P * l^2}{d} * \left(\frac{Pl^2}{32 * E * d^2} + \frac{0.15}{G}\right);$$

where P is the pressure of the plastic in the mold cavity 22 acting on the surfaces 50, 52 of the tool elements 46, 63; d is the depth of the tool element 46 or 63 in the z direction (i.e., the mold wall thickness mwt); l is the width of the cooling channel 80 indicated in FIG. 10 and also indicated as cc in FIG. 8; E is the tensile modulus in N/mm$^2$ of each of the fins 56 or 68; G is the shear modulus in N/mm$^2$ of each of the fins 56 or 68; $\sigma_{bmax}$ is the allowable tensile stress of each of the fins 56 or 68; $\tau_{max}$ is the allowable shear stress in N/mm$^2$ of each of the fins 56 or 68; and $f_{max}$ is the maximum allowed deflection of the tool elements 46, 63.

Following block 110, the method 100 proceeds to block 112, in which temperatures are calculated for the tool surface elements 84A, 84B, 84C, 84D, and 84E corresponding with the cooling elements 82A, 82B, 82C, 82D, and 82E. It should be appreciated that only tool surface elements 84A, 84B, 84C, 84D, and 84E and corresponding cooling elements 82A, 82B, 82C, 82D, and 82E for a portion of one cooling channel 80 are illustrated in FIG. 9, but the calculated temperature distribution in block 112 is based on, and the remaining blocks of the method 100 are carried out with respect to all tool surface elements 84 and all cooling elements 82 of all of the cooling channels 80 simultaneously. Block 110 may be carried out according to various steady state conduction equations described herein to provide a mold surface temperature distribution. The calculation of the temperature distribution in block 112 may be according to a tool design program that interfaces one or more other programs that carry out portions of the method 100, such as to provide cooling element location iterations as described herein. The injection pressure distribution of the injected plastic in the mold cavity 22 on the surfaces 50, 52 of the tool elements 46, 63 would be provided as an input to the tool design program prior to the temperature distribution calculation in block 112. Any suitable programming language can be used for interfacing the calculation of temperatures in block 112 based on the cooling elements (and therefore cooling channel) layouts, which can be accomplished by a computer aided engineering mold flow software program, block 114 (integration controller), and block 118, generating revised cooling element locations by solving an optimization algorithm.

Based on the temperature distribution of the tool surface elements 84 provided in block 112, the method 100 then proceeds to block 114 to determine whether the predetermined condition is satisfied. If the predetermined condition is simply performing block 112 a predetermined number of times, then the determination in block 112 can be made by a simple counting function included in the algorithm. However the predetermined condition may be satisfying a requirement that the temperatures of all of the tool surface elements 84 calculated in block 112 are within a predetermined range of a target temperature, which may be referred to as a convergence condition. The target temperature may be 10 degrees Celsius to 300 degrees Celsius depending on the application and resin used in the plastic material. The temperatures of the tool surface elements 84 are determined from the heat flow relationships described herein between the molded plastic material, the tool element 46, and the coolant flow. There may be additional requirements for the convergence condition, such as that the calculated temperatures of all of the tool surface elements 84 of the tool element 46 may also be required to be within 5 degrees Celsius of one another. Additionally, the convergence condition may also require that the temperatures of all of the tool surface elements 84 of the tool element 63 must also be within 5 degrees Celsius of one another when the second mold tool 16 is separately analyzed under the method 100. When both of these requirements for the tool element 46 and the tool element 63 are met, satisfaction of the convergence condition may also require that the difference in the average temperature of the tool element 46 and the tool element 63 must not be more than 20 degrees Celsius.

If the predetermined condition is satisfied in block 114, then locations of the cooling elements 82 are optimized, and the method 100 moves to block 116 in which a tool element 46 and pillars 56 corresponding with the cooling element positions is provided. A tool element 63 corresponding with cooling element 82 positions following the analysis of the coolant flow cavity 72 is also provided. As discussed herein, optimization of other factors affecting the final dimensions determined for the tool elements 46, 63 and pillars 56, 68 can also be considered and reflected in the heat flow calculations undertaken in determining the temperature distribution of tool surface elements 84 and resulting positions of the cooling elements 82. By way of non-limiting example, the dimensions of the tool elements 46, 63, and of the pillars 56, 68 can also be optimized for one or more of the following: to minimize cooling time, provide a heat flow balance in which the coolant heat flow in the coolant flow cavities 60, 72 is equal to the heat flow of the plastic melt in the mold cavity 22, to provide a coolant flow rate that minimizes a temperature differential across the tool elements 46 and 63 and enables cooling channel efficiency, to provide a pattern for the cooling elements 82 that ensures turbulent flow (e.g., Reynolds number greater than 2,300), to provide final positions of the cooling elements 82 that provide uniform heat flow through the tool elements 46, 63, to ensure adequate tool life based on (i) a cyclical stress failure curve, (ii) a pressure map of pressure applied to the tools 14, 16, and (iii) the number of cycles the injection mold assembly 10 will be utilized, and to ensure that a pressure drop across each cooling channel 80 would be enabled by a capable external heat extraction process.

If the predetermined condition is not satisfied in block 114, then the method 100 instead moves to block 118 in which a revised layout of the cooling elements 82, and hence the cooling channels 80, is generated according to an optimization algorithm that uses the calculated temperatures of the tool surface elements 84 from block 112. In other words, the Cartesian coordinates of each of the cooling elements 82 in the revised layout is based on the temperature distribution of the tool surface elements 84.

A scalar field F is generated for the tool surface elements 84 and cooling elements 82 in the region of the tool element 46 or 63 that is in contact with the plastic in the mold cavity 22, and another scalar field is generated for the tool surface elements 84 and the cooling elements 82 in the region of the tool element 46 or 63 that is not in contact with the plastic in the mold cavity 22. The value for each of the tool surface elements 84 and cooling elements 82 is expressed as a scalar function:

$$F=F(x,y,z), \text{ where } x,y,z \text{ are the Cartesian coordinates.}$$

The scalar fields drive the moving of the cooling elements 82 in each iteration, as Laplacian operation for Laplacian F=0 is performed for each of the regions of the tool element 46 and 63 (i.e., the region in contact with the plastic and the region not in contact with the plastic). Each Laplacian operator is given by a sum of second derivatives of the function with respect to each independent variable as described herein. The movement of each cooling element 82 from its location (Cartesian coordinates) in the previous layout to its new location in the succeeding revised layout is defined by the gradient of the scalar function:

v=−∇F, where v is the moving vector for the local mold region. For example, the optimization algorithm for steady state heat conduction begins with the overall heat transfer governed by the three-dimensional Poisson equation:

$$\rho C_p \frac{\partial T}{\partial t} = k\left(\frac{\partial^2 T}{\partial x^2} + \frac{\partial^2 T}{\partial y^2} + \frac{\partial^2 T}{\partial z^2}\right)$$

for $\bar{r} \in \Omega$; where T is the temperature of the tool surface element 84 at the x,y,z Cartesian coordinate; t is time; ρ is the density of plastic; $C_p$ is the specific heat of plastic; r radius and Ω is the domain. For the steady state LaPlace equation then:

$$k_m\left(\frac{\partial^2 \bar{T}}{\partial x^2} + \frac{\partial^2 \bar{T}}{\partial y^2} + \frac{\partial^2 \bar{T}}{\partial z^2}\right) = 0 \text{ for } \bar{r} \in \Omega_m;$$

where $k_m$ is mean thermal conductivity and $\bar{T}$ is the cycle average mold temperature (i.e., the average temperature of the plastic in the mold cavity 22 during the molding time of the object 12, not including the opening and closing time of the mold tools 14, 16). Accordingly, the steady state LaPlace equation provides the gradient, or the direction of movement, for each cooling element 82 from one cooling channel layout to the next iterative cooling channel layout. With the direction of movement known for each cooling element 82, any one of many standard potential optimization algorithms can then be used to determine the next sets of Cartesian coordinates for the cooling elements 82, with each cooling element 82 moving in a direction in accordance with the gradient determined from the solution of the steady state LaPlace equation. The LaPlacian will be positive if concave and negative if convex. The results will be compared to the average. This will direct the sequential optimization. Other standard optimization methods may be used for approximation or for certain subroutines, prior to using the LaPlacian, such as the kriging method or the Monte Carlo method. These may be used along with Design of Experiments (DOE) methods or sampling techniques such as full factorial, D-optimal design, central composite design, orthogonal array, and Latin hypercube.

As discussed herein with respect to FIG. 8, groups of adjacent cooling elements 82 can be linked in a pattern, such as a triplet linked pattern 88 of cooling elements 82. Other patterns of linked cooling elements 82 can instead be used. The use of a linked pattern of cooling elements is beneficial because it avoids strong gradients or large changes between adjacent cooling elements. For example, the system can apply a rule such that features of adjacent elements do not vary by more than 10 percent.

Thus, after block 118, in which each cooling element 82 is moved according to the results of the vector field generated from the scalar field and the selected optimization algorithm, the method 100 returns to block 112, and the revised cooling element locations (making up the corresponding revised cooling channels 80) are provided as inputs to block 112, the portion of the algorithm that calculates temperatures of the tool surface elements 84 corresponding with the new cooling element locations (i.e., normal to each cooling element location and at the surface of the tool element 46 or 63).

The recalculated surface temperature profile in block 112 is then evaluated in block 114 to determine whether the predetermined condition is satisfied. Blocks 112, 114, and 118 are repeated until the predetermined condition is satisfied. When the predetermined condition is satisfied, the final positions of the cooling elements 82 are known, and the corresponding positions and dimensions of the pillars 56, 68 are therefore known. The method 100 thus moves from block 114 to block 116, in which the mold tools 14, 16 with the tool elements and pillars 56, 68 are manufactured and provided as discussed above.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An injection mold assembly for injection molding an object, the injection mold assembly comprising:
   a first mold tool having a first tool surface;
   a second mold tool having a second tool surface; wherein the first and the second tool surfaces are cooperatively configured to define a mold cavity between the tool surfaces for injection molding the object;
   wherein the first mold tool has:
      a tool element having a first side with the first tool surface and a second side opposite the first side;
      multiple fins extending from the second side of the tool element; and
      a base supporting the fins; wherein the tool element, the fins and the base define a coolant flow cavity at the second side of the tool element;
   wherein the fins are configured so that a temperature distribution of the first tool surface is substantially uniform and is within a predetermined range of temperatures when coolant flows through the coolant flow cavity.

2. The injection mold assembly of claim 1, wherein thickness of the tool element between the first side and the second side remains within a predetermined range of thicknesses over the first tool surface.

3. The injection mold assembly of claim 2, wherein positions of the multiple fins and resulting cooling flow paths within the coolant flow cavity are determined according to an optimization algorithm correlating cooling element locations correlated with the temperature distribution of tool elements on the first tool surface according to heat transfer so that coolant flow at the second side of the tool element promotes uniform cooling of the first tool surface.

4. The injection mold assembly of claim 1, wherein each of the fins has a respective height from the base to the second side of the tool element; and wherein at least some of the fins have an airfoil-shaped cross-section normal to the height.

5. The injection mold assembly of claim 1, wherein each of the fins has an outer surface in contact with cooling fluid in the coolant flow cavity and a respective height from the base to the second side of the tool element; and wherein at least some of the fins are each oriented about a respective longitudinal axis along the height such that the outer surface directs flow of the cooling fluid to promote the substantially uniform temperature distribution at the first tool surface.

6. The injection mold assembly of claim 1, wherein the tool element is tool steel; and wherein the fins are aluminum.

7. The injection mold assembly of claim 1, wherein the fins are integral with the tool element.

8. The injection mold assembly of claim 1, wherein the fins are integral with the base.

9. An injection mold assembly for injection molding an object, the injection mold assembly comprising:
   a first mold tool having a first tool surface;
   a second mold tool having a second tool surface; wherein the first and the second tool surfaces are cooperatively configured to define a mold cavity between the tool surfaces for injection molding the object;
   wherein the first mold tool has:
      a tool element having a first side with the first tool surface and a second side opposite the first side;
      multiple fins connected to and extending from the second side of the tool element;
      a base supporting the fins; wherein the tool element, the fins and the base define a coolant flow cavity at the second side of the tool element;
      wherein the tool element is configured to have a substantially uniform thickness between the first tool surface and the cooling cavity; and
      wherein the multiple fins are configured so that the first tool surface has a substantially uniform temperature distribution when coolant flows through the cavity via cooling flow paths established by the multiple fins; and wherein the multiple fins are positioned according to an optimization algorithm based on a distribution of calculated temperatures at the first tool surface.

10. The injection mold assembly of claim 9, wherein the cooling flow paths are between adjacent ones of the fins and have widths configured so that tensile stress, shear stress, and deflection of the tool element are below predetermined maximum limits.

11. The injection mold assembly of claim 1, wherein the first tool surface and the second tool surface are curved.

12. The injection mold assembly of claim 9, wherein the first tool surface and the second tool surface are curved.

* * * * *